United States Patent Office 3,457,114
Patented July 22, 1969

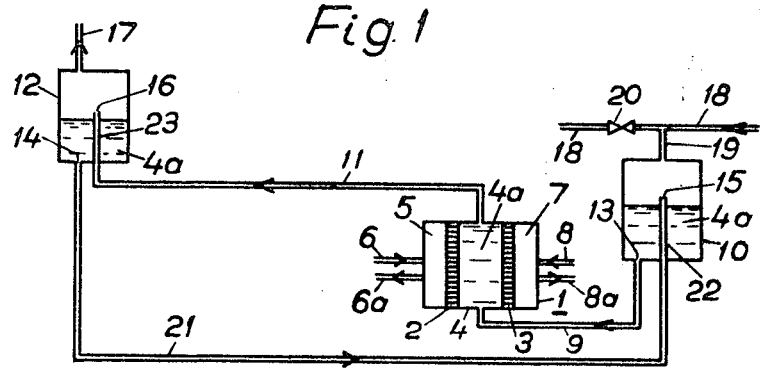

3,457,114
METHOD OF CIRCULATING A FLUID ELECTROLYTE IN A GALVANIC CELL, FOR EXAMPLE A FUEL CELL, AND MEANS FOR PERFORMING THE METHOD
Thord Wedin, Vasteras, Sweden, assignor to Allmanna Svenska Elektriska Aktiebolaget, Vasteras, Sweden, a corporation of Sweden
Filed Jan. 3, 1967, Ser. No. 607,013
Claims priority, application Sweden, Dec. 31, 1965, 17,052/65
Int. Cl. H01m 27/06, 29/02
U.S. Cl. 136—86                                8 Claims

ABSTRACT OF THE DISCLOSURE

An electrolyte is circulated in a galvanic (fuel) cell having an electrolyte chamber by connecting, through one-way conduits, a first storage chamber to the bottom of the electrolyte chamber, the top of the electrolyte chamber to a second storage chamber, and the second storage chamber to the first storage chamber, and moving the electrolyte from the first storage chamber to the electrolyte chamber, from the electrolyte chamber to the second storage vessel and from the second storage vessel to the first storage vessel.

BACKGROUND OF THE INVENTION

Field of the invention

The operation of cells containing a fluid electrolyte such as fuel cells.

In the operation of fuel cells and other galvanic cells such as accumulators having fluid electrolyte, it is usually necessary to circulate the electrolyte in an outer circuit in order, among other things, to cool the electrolyte and remove reaction products so that the electrolyte in the cell can be kept at optimum temperature and optimum chemical composition.

In order to achieve this, it has hitherto been usual to effect the circulation with a pump arranged in the electrolyte circuit.

However, there are disadvantages in using circulation pumps for the electrolyte since there is risk of their becoming clogged resulting in disturbance in operation and also since it is difficult to prevent the parts of the pump which come into contact with the electrolyte from becoming corroded and the electrolyte thus becoming contaminated.

SUMMARY OF THE INVENTION

These disadvantages are avoided according to the present invention which enables circulation of the electrolyte without its coming into contact with any movable elements for the transport of the electrolye, or only with a minimum of movable parts.

The present invention relates more specifically to a method of circulating an electrolyte through an electrolyte chamber in a galvanic cell, for example a fuel cell, having a fluid electrolyte in the electrolyte chamber, characterised in that the lower part of the electrolyte chamber is connected to a first storage vessel for the electrolyte by means of a conduit for one-way, or substantially one-way, transport of the electrolyte from the first storage vessel to the electrolyte chamber, that the upper part of the electrolyte chamber is connected to a second storage vessel for the electrolyte by means of a conduit for one-way, or substantially one-way, transport of the electrolyte from the electrolyte chamber to the second storage vessel and that the first and second storage vessels are connected to each other outside the electrolyte chamber by means of a conduit for one-way, or substantially one-way, transport of the electrolyte from the second to the first storage vessel and that the transport of electrolyte from the first storage vessel to the electrolyte chamber, from the electrolyte chamber to the second storage vessel and from the second to the first storage vessel is effected by varying the pressure in the gas phase above the electrolyte in at least one of the storage vessels.

According to a particularly advantageous embodiment of the invention when used in fuel cells, the variation of the pressure in the gas phase above the electrolyte in the first storage vessel may be effected by a flowing gas in contact with the gas phase which, after passing through or by this storage vessel, is led to the upper part of the electrolyte chamber and from there to the second storage vessel. It is thus possible for the upper part of the electrolyte chamber to be washed with inert gas to prevent the formation of explosive gas mixtures due to the leakage of, for example, hydrogen and oxygen through the porous electrodes from the gas chambers of the fuel cell containing gaseous fuel and oxidant.

To perform the method an arrangement can advantageously be used in which the previously mentioned variation of the pressure is effected by connecting the gas phase above the electrolyte in at least one storage vessel to a conduit containing a source of compressed gas and having an adjustable means producing resistance to flow of gas therethrough. The purpose of the adjustable means is to give a defined and adjustable pressure drop. The simplest form for such an adjustable means is a throttle valve.

If the outlet of the conduit for electrolyte transport from one storage vessel is at a lower level than the inlet of the conduit for electrolyte transport to the storage vessel, it is possible for the electrolyte to flow from the vessel through the first-mentioned conduit without any noticeable quantity of the electrolyte being transported from the storage vessel through the last-mentioned conduit. If the outlet and inlet are arranged in this way in the first storage vessel and the gas phase of the vessel is connected to a source of compressed gas, movable parts in the electrolyte circuit can be completely eliminated if the outlet in the second storage vessel of the conduit for electrolyte transport from this storage vessel is arranged at a higher level than the outlet in the first storage vessel of the conduit for electrolyte transport from this storage vessel. If also the outlet in the second storage vessel of the conduit for electrolyte transport from this storage vessel to the first storage vessel is at a higher level than the inlet of the conduit for electrolyte transport to the first storage vessel, the advantage mentioned can be achieved with a smaller quantity of electrolyte.

BRIEF DESCRIPTION OF THE DRAWING

The invention will be described in more detail by describing a number of embodiments with reference to the accompanying drawing in which FIGURE 1 shows a means where the gas phase of one storage vessel is connected to a gas pressure source, FIGURE 2a means where the gas phases of both storage vessels are connected to sources of compressed gas, FIGURE 3 a modification of the means according to FIGURE 1, FIGURE 4 a means where a flowing gas is utilized to pressurize one storage vessel and to remove possibly arising damaging gases from the upper part of the electrolyte chamber, and FIGURE 5, finally, a means for adjusting the pressure in the gas phase in a storage vessel. In the following detailed description the fuel cell has been chosen as an example of a galvanic element for which the invention can be used.

DESCRIPTION OF THE PREFERRED EMBODIMENTS

Figure 4:
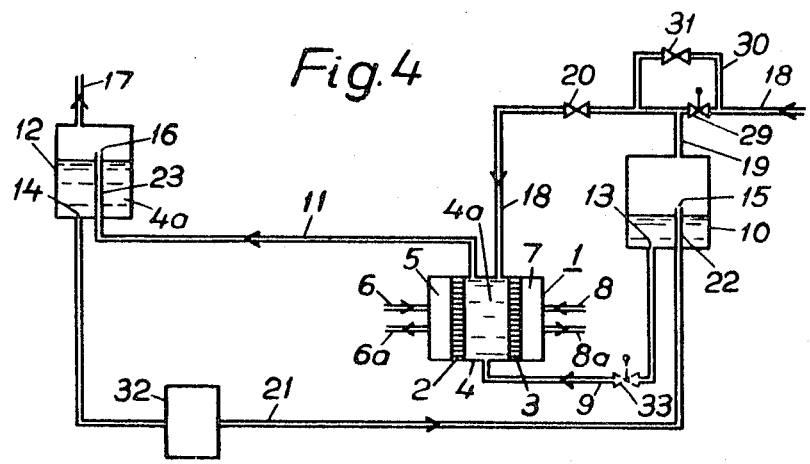

The fuel cell 1 according to FIGURE 1 contains two porous electrodes 2 and 3. Between the electrodes is the electrolyte 4a, for example potassium hydroxide, in the electrolyte chamber 4. Outside the electrode 2 is a gas chamber 5 containing a gaseous fuel, for example hydrogen, supplied through the conduit 6. Unconsumed fuel flows out through the conduit 6a. Outside the electrode 3 is similarly a gas chamber 7 containing a gaseous oxidant, for example oxygen, which is supplied through the conduit 8. Unconsumed oxidant flows out through conduit 8a. The lower part of the electrolyte chamber 4 is connected by means of the conduit 9 to a first storage vessel 10 for the electrolyte and the upper part of the electrolyte chamber 4 is connected by means of a conduit 11 to a second storage vessel 12 for electrolyte. The second storage vessel 12 is in communication with the first storage vessel 10 by means of the conduit 21. The transport of electrolyte through the conduits takes place in the direction indicated by the arrows. In each of the vessels 10 and 12 the outlets 13 and 14 are situated at lower levels than the inlets 15 and 16, respectively, for the electrolyte. The outlet 13 and also the inlet 15 are, furthermore, at a lower level than the outlet 14. The upper part of the vessel 12 is provided with an outlet tube 17. The vessel 10 is connected by the conduit 19 to a conduit 18 connected to an external gas pressure source, not shown, supplying gas at constant pressure, for example air or nitrogen, and an adjustable means producing resistance to flow of the gas in the form of a throttle valve 20. Of course the source of compressed gas may be provided with a reducing valve or the like so it can be set to deliver the desired degree of pressure.

When the electrolyte is circulated in the electrolyte circuit the valve 20 is first throttled so that the pressure in the gas phase in the vessel 10 increases. This causes liquid in the vessel to be pressed out through the conduit 9. The liquid level in the tube 22 will thus fall causing a negligible amount of liquid to be pressed out of the conduit 21 as well. Since the electrolyte is transported in the conduit 9, electrolyte is also transported through the electrolyte chamber 4 and the conduit 11 and through the tube 23 with the outlet 16 to the storage vessel 12. By reducing the throttling in the valve 20 the pressure in the vessel 10 is reduced so that the electrolyte in the vessel 12 flows back of its own accord to the vessel 10 through the outlet 14 and the conduit 21 with the inlet 15. Of course, for this to take place the pressure in the vessel 10 must be lowered to a valve below the hydrostatic pressure of the electrolyte in the vessel 12.

If in accordance with FIGURE 2 the vessel 12 is also connected by a conduit 24 to a conduit 23 containing a source of compressed gas, which may be the same as for the vessel 10, and an adjustable means producing resistance to flow of the gas in the form of a throttle valve 25, and one of the conduits 9 and 11 is provided with a non-return valve 27 and the conduit 21 with a non-return valve 28, the electrolyte can be made to circulate in the direction indicated by the arrows without the need to arrange the vessels or their inlets and outlets at definite levels in relation to each other. The transport of the electrolyte is effected by increasing the pressure alternately in the vessels 10 and 12 with the help of throttle valves. As seen in FIGURE 2, in the exemplified case a fuel, for example methanol, is used dissolved in the electrolyte while the oxidant is gaseous.

In the arrangement according to FIGURE 3 the gas source supplying the gaseous fuel to the fuel cell is used as the source of compressed gas to vary the pressure in the first storage vessel 10. The unconsumed fuel in the fuel cell is led in this case from the conduit 6a to the conduit 18. It is, of course, also possible to use the unconsumed oxidant in a corresponding manner. The electrolyte transport in the electrolyte circuit takes place in the same way as in the arrangement according to FIGURE 1 by altering the throttling of the valve 20. 42 designates a reducing valve with the help of which the pressure from the source of compressed gas can be set at the desired level.

FIGURE 4 shows a modification of the arrangement according to FIGURE 1 in which a flowing inert gas from the pressure source is also used to wash away damaging or explosive gases collected in the upper part of the electrolyte chamber. These may consist of gaseous fuel and gaseous oxidant which have leaked into the electrolyte chamber via the porous electrodes, or of gases formed at the electrolyte reaction. In the shown arrangement the conduit 18 continues from the source of compressed gas to the upper part of the electrolyte chamber. The branch conduit 30 contains a throttle valve 31 and the conduit 18 a magnetic valve 29. The valve 20 also acts as an adjustable means producing resistance to flow of gas in this arrangement. A device 32 is also schematically inserted in the conduit 21 and may constitute a cooling means or purifying equipment. If the fuel cell operates with hydrogen and oxygen, water is formed during the reaction. It may therefore also be suitable to remove the water produced in an evaporation apparatus which may advantageously be arranged in a special circuit near one of the storage vessels.

The circulation of electrolyte in the arrangement according to FIGURE 4 is effected in the manner described for the arrangement according to FIGURE 1 with the following modifications. When the magnetic valve 29 opens, the gas pressure in the vessel 10 increases causing the electrolyte to flow, in the manner previously described, to the vessel 12. When the valve 29 closes, the electrolyte flows from the vessel 12 back to the vessel 10. The valves 31 and 20 are kept at least a little open the whole time so that the gas, even when the valve 29 is closed, can always flow to the electrolyte chamber 4 via the conduits 30 and 18. When the valve 29 is open, therefore, the gas flow increases in the conduit 18 and the pressure in that part of the conduit 18 situated after the valve 20 will be less than the pressure in the electrolyte conduit 9. There is thus no risk of the electrolyte being forced backwards in the conduit 9. For safety an extra magnetic valve 33 may possibly be connected in the conduit 9 and electrically parallel-connected to the magnetic valve 29.

If the electrolyte vessels 10 and 12 in the arrangements according to FIGURES 1–4, are placed so high that the liquid levels in them are above the electrolyte level in the electrolyte chamber 4 there is never any danger of the electrolyte level becoming too low in the electrolyte vessel. In the arrangements according to FIGURES 1, 3 and 4, safety valves 27 and 28 may be arranged in the conduits 9 and 21 as safety measures, as in the arrangement according to FIGURE 2.

Figure 5:
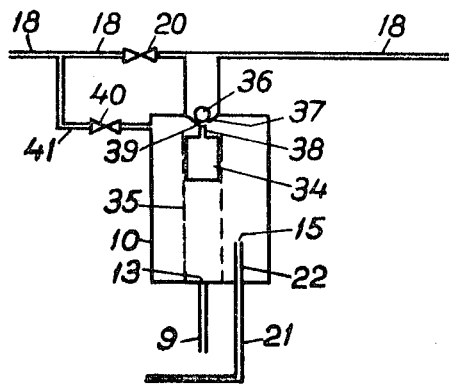

FIGURE 5 shows a modification of the storage vessel according to FIGURES 1–4. Variation of the pressure in the gas phase in the vessel 10 can be effected according to this modification, besides the valve 20, with a float 34 the vertical movement of which is controlled for example by a perforated cylinder 35 and a sealing means cooperating with the float and consisting of, for example, a ball 36 sealing against a seat 37. The float is provided with an extension 38 shaped to fit the shape of the hole 39 in the seat 37. When the electrolyte is supplied to the vessel 10 and has risen to a certain level the float lifts the ball 36 so that gas can flow in and lower the liquid level thus effecting electrolyte transport through the conduit 9. When the liquid level in the vessel 10 has decreased so much that the ball 36, due to the lowering of the float 34, seals against the seat 37, the liquid level continues to fall until the pressure in the vessel 10 corresponds to the hydrostatic pressure in the vessel 12, after which the liquid level in the vessel 10 increases again as the gas flows out through the conduit 41 with throttle valve 40. The described process is then repeated.

Of course, the vessels 10 and 12 according to the arrangements shown in the drawings may be built together to one unit, suitably with the vessel 12 above the vessel 10, thus saving space.

I claim:

1. A method of circulating a fluid electrolyte through an electrolyte chamber in a galvanic cell, said electrolyte chamber having a lower and an upper part, and having means connecting the lower part of the electrolyte chamber to a first storage vessel for the electrolyte by means of a conduit for substantially one-way transport of the electrolyte from the first storage vessel to the electrolyte chamber, means connecting the upper part of the electrolyte chamber to a second storage vessel for the electrolyte by means of a conduit for substantially one-way transport of the electrolyte from the electrolyte chamber to the second storage vessel, a means connecting the first storage vessel and the second storage vessel to each other outside the electrolyte chamber by means of a conduit for substantially one-way transport of the electrolyte from the second storage vessel to the first storage vessel, said first storage vessel and said second storage vessel having a gas phase above the electrolyte, comprising varying the pressure in the gas phase in at least one of the first and second storage vessels to cause the electrolyte to be transported from the first storage vessel to the electrolyte chamber, from the electrolyte chamber to the second storage vessel and from the second storage vessel to the first storage vessel.

2. Method as claimed in claim 1 in which the pressure in the gas phase of the first storage vessel is varied by a flowing gas in contact with the gas phase of the first storage vessel, which flowing gas is led to the upper part of the electrolyte chamber and from there to the second storage vessel.

3. Method as claimed in claim 1 in which the pressure in the gas phase of the first storage vessel is varied by a flowing gas which is led through the first storage vessel, from the first storage vessel to the upper part of the electrolyte chamber and from the electrolyte chamber to the second storage vessel.

4. Means for circulating a fluid electrolyte through an electrolyte chamber in a galvanic cell, said electrolyte chamber having a lower and an upper part, comprising a first storage vessel connected to the lower part of the electrolyte chamber by means of a conduit for substantially one-way transport of the electrolyte from the first storage vessel to the electrolyte chamber, a second storage vessel connected to the upper part of the electrolyte chamber by means of a conduit for substantially one-way transport of the electrolyte from the electrolyte chamber to the second storage vessel, a conduit connecting the second storage vessel and the first storage vessel outside the electrolyte chamber for substantially one-way transport of the electrolyte from the second storage vessel to the first storage vessel, said first storage vessel and said second storage vessel having a gas phase above the electrolyte, and means connecting the gas phase in at least one storage vessel to a conduit containing a gas pressure source and an adjustable means producing resistance to flow of gas therethrough.

5. Means as claimed in claim 4, in which in at least one storage vessel the outlet of the conduit for electrolyte transport from the storage vessel is on a lower level than the inlet of the conduit for electrolyte transport to the storage vessel.

6. Means as claimed in claim 5 in which the outlet in the second storage vessel of the conduit for electrolyte transport from the second storage vessel to the first storage vessel is at a higher level than the outlet in the first storage vessel of the conduit for electrolyte transport from the first storage vessel to the electrolyte chamber and the gas pressure source is connected to the gas phase in the first storage vessel.

7. Means as claimed in claim 6 in which the outlet in the second storage vessel of the conduit for electrolyte transport from the second storage vessel to the first storage vessel is on a higher level than the inlet of the conduit for electrolyte transport to the first storage vessel.

8. Means as claimed in claim 4 in which the first storage vessel is connected to a conduit having a gas pressure source delivering a flowing gas, said conduit containing an adjustable means producing resistance to flow of gas therethrough and also being connected to the upper part of the electrolyte chamber.

References Cited

UNITED STATES PATENTS

| | | | |
|---|---|---|---|
| 3,342,641 | 9/1967 | Burhorn et al. | 136—86 |
| 3,256,163 | 6/1966 | Winsel et al. | 136—86 |

WINSTON A. DOUGLAS, Primary Examiner

HUGH A. FEELEY, Assistant Examiner